(12) United States Patent
Hwang

(10) Patent No.: US 8,668,468 B2
(45) Date of Patent: Mar. 11, 2014

(54) OIL PUMP SYSTEM FOR AUTOMATIC TRANSMISSION

(75) Inventor: Jin Young Hwang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 207 days.

(21) Appl. No.: 13/170,555

(22) Filed: Jun. 28, 2011

(65) Prior Publication Data

US 2012/0141302 A1    Jun. 7, 2012

(51) Int. Cl.
*F04B 25/02*    (2006.01)

(52) U.S. Cl.
USPC ............ 417/253; 417/288; 477/158; 475/137

(58) Field of Classification Search
CPC .......... F04B 49/24; F04C 14/26; F16D 48/02; F16H 61/0025
USPC ......... 417/250, 251, 253, 286, 288, 302, 304, 417/307, 308; 192/85.1, 85.63; 477/156, 477/157, 158, 164; 475/159, 127, 136, 137
See application file for complete search history.

(56) References Cited

U.S. PATENT DOCUMENTS

| 4,347,044 A * | 8/1982 | Ahlen et al. | 417/253 |
| 2008/0138220 A1 * | 6/2008 | Kang | 417/437 |

FOREIGN PATENT DOCUMENTS

| JP | 61-181151 U | 11/1986 |
| JP | 3635671 B2 | 1/2005 |
| JP | 2005-233100 A | 9/2005 |
| KR | 10-2004-0040932 A | 5/2004 |
| KR | 10-2008-0055043 A | 6/2008 |

* cited by examiner

*Primary Examiner* — Bryan Lettman
(74) *Attorney, Agent, or Firm* — Morgan, Lewis & Bockius LLP

(57) ABSTRACT

A hydraulic pump system for an automatic transmission has the advantages of preventing excessive power loss and durability deterioration. The hydraulic pump system may include a first hydraulic pump that generates a first hydraulic pressure to supply a low pressure portion with the first hydraulic pump, a second hydraulic pump that receives the first hydraulic pressure to generate a second hydraulic pressure higher than the first hydraulic pressure and supplies a high pressure portion with the second hydraulic pressure, and a drive portion that rotates a drive shaft that integrally connects the first hydraulic pump with the second hydraulic pump.

7 Claims, 3 Drawing Sheets

OIL PUMP SYSTEM FOR AUTOMATIC TRANSMISSION

CROSS-REFERENCE TO RELATED APPLICATION

This application claims priority to and the benefit of Korean Patent Application No. 10-2010-0123019 filed Dec. 3, 2010, the entire contents of which application is incorporated herein for all purposes by this reference.

BACKGROUND OF INVENTION

1. Field of Invention

The present invention relates to a hydraulic pump system for an automatic transmission that is configured to minimize a power loss caused by a hydraulic pump.

2. Description of Related Art

For example, a hydraulic pump that is operated by an engine has a suction hole that is connected to an oil fan to supply a discharge hole with pumped oil in a hydraulic pump system for an automatic transmission.

The discharge hole is connected to a high pressure portion (for example, clutch) through a high pressure passage, and a high pressure regulating valve is disposed on a high pressure passage. The high pressure passage supplies a high hydraulic pressure to the high pressure portion. Also, a pressure reduction valve is interposed on the high pressure passage to be connected to a low pressure passage. The low pressure passage supplies a low pressure portion to a low pressure portion (for example, lubrication portion).

The high pressure regulating valve and the pressure reduction valve set a high pressure and a low pressure to recirculate remained oil to a suction hole of the hydraulic pump. Generally, the low pressure portion is used to lubricate an automatic transmission and therefore large amount of oil is necessary and the high pressure portion is used to control a clutch and therefore small amount of oil is necessary.

However, the hydraulic pump pumps entire oil flux base on the high pressure portion and therefore an excessive load is applied to the pump. A durability is deteriorated, a power is lost, and noise and pressure vibration are generated thereby.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a hydraulic pump system for an automatic transmission having advantages of preventing excessive power loss and durability deterioration.

Various aspects of the present invention provide for a hydraulic pump system for an automatic transmission having advantages of pumping entire oil flux by a low pressure portion and discharging a necessary oil flux by a high pressure portion to reduce noise and pressure vibration of a hydraulic pump.

A hydraulic pump system for an automatic transmission according to various aspects of the present invention may include a first hydraulic pump that generates a first hydraulic pressure to supply a low pressure portion with the first hydraulic pump, a second hydraulic pump that receives the first hydraulic pressure to generate a second hydraulic pressure higher than the first hydraulic pressure and supplies a high pressure portion with the second hydraulic pressure, and a drive portion that rotates a drive shaft that integrally connects the first hydraulic pump with the second hydraulic pump.

The first hydraulic pump may be connected to an oil fan through a first suction hole to suck in oil and is connected to a low pressure portion through the first discharge hole to discharge the first hydraulic pressure, and the second hydraulic pump may suck the first hydraulic pressure through a connection passage that connects the first discharge hole with a second suction hole and is connected to the high pressure portion through the second discharge hole to discharge the second hydraulic pressure.

The first discharge hole may be connected to the low pressure portion through a low pressure passage and the second discharge hole may be connected to the high pressure portion through a high pressure passage.

A low pressure regulating valve that is connected to the low pressure passage may set the first hydraulic pressure to return remained oil to the oil fan.

The first switch valve that is connected to the high pressure passage may control a oil that is diverged from the second hydraulic pressure, and a high pressure regulating valve that is connected to the first switch valve may control oil passing the first switch valve that is turned on to set the second hydraulic pressure and recirculates remained oil to the second suction hole.

A second switch valve that is disposed on the high pressure passage may control the second hydraulic pressure that is supplied to the high pressure portion, supplies the high pressure portion with the second hydraulic pressure that is discharged from the second discharge hole by an operation of the first switch valve, and recirculates the first hydraulic pressure that is discharged from the second discharge hole by an disoperation of the first switch valve to the second suction hole.

The first switch valve and the second switch valve may be connected to a solenoid valve to be on/off controlled.

The hydraulic pump system for an automatic transmission may further include a first check valve that is disposed between the high pressure passage and the low pressure passage, and a second check valve that is disposed on the high pressure passage between the second switch valve and the high pressure portion.

The drive portion may include an engine or a motor.

A first oil flux of the first hydraulic pump may be larger than that of the second hydraulic pump.

In various embodiments of the present invention as described above, the first hydraulic pump discharges an entire oil flux based on a low pressure and the second hydraulic pump discharges a necessary high pressure such that an excessive load is not applied to the hydraulic pump to prevent a power loss and durability thereof. Also, noise and pressure vibration of the hydraulic pump can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
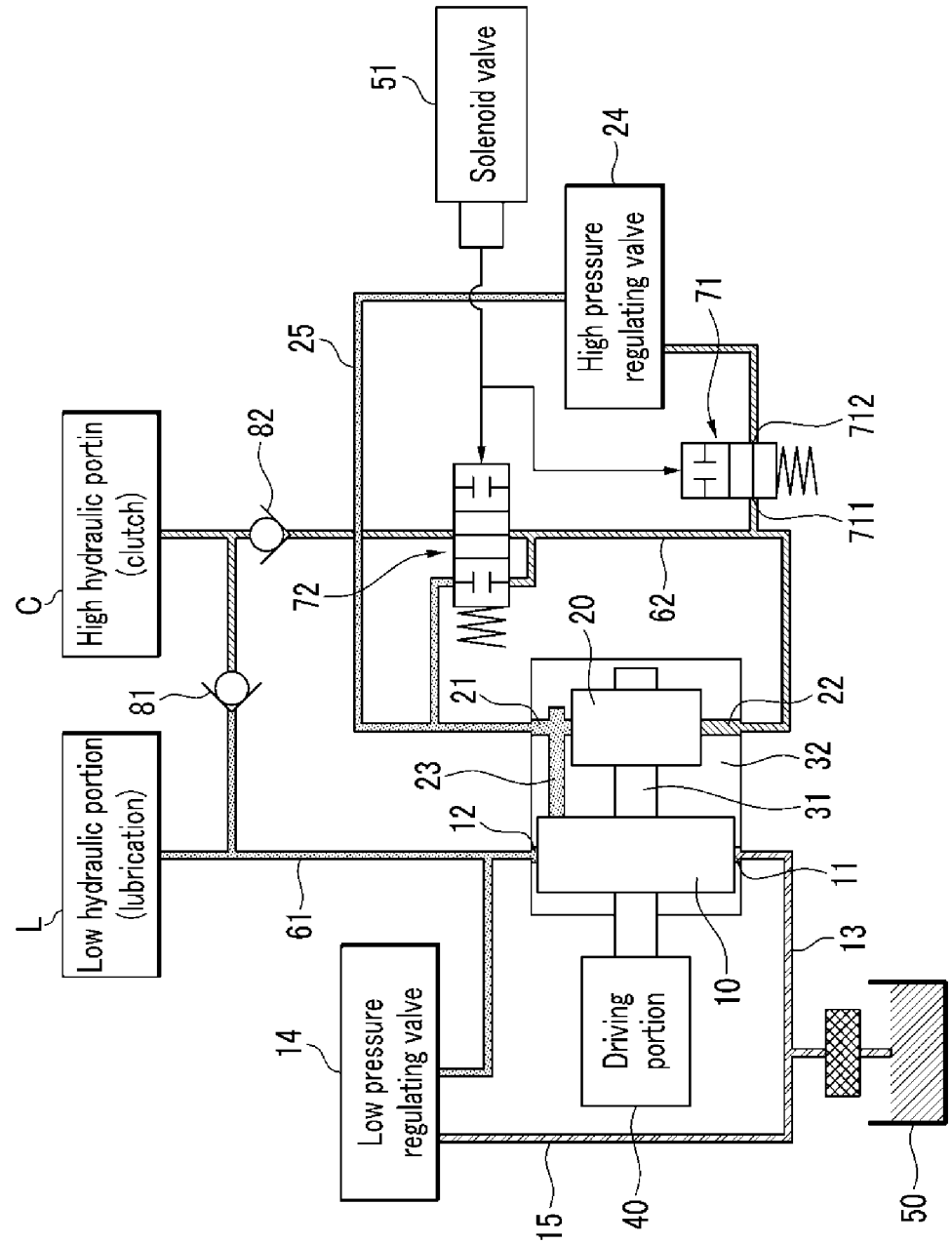
FIG. 1 is a hydraulic circuit diagram showing a condition that a high pressure portion of an exemplary hydraulic pump system for an automatic transmission is operated according to the present invention.

FIG. 1 is a hydraulic circuit diagram showing a condition that a high pressure portion of a hydraulic pump system for an automatic transmission (hereinafter, it is referred to as "hydraulic pump system") is operated according to various embodiments of the present invention. That is, the hydraulic pump system supplies a high pressure portion (for example, clutch) (C) with a high hydraulic pressure and supplies the low pressure portion (for example, lubrication portion) (L) with a low hydraulic pressure.

Referring to FIG. 1, the hydraulic pump system according to various embodiments includes a first hydraulic pump 10 that generates a first hydraulic pressure (hereinafter, it is referred to as a "low pressure"), a second hydraulic pump 20 that generates a second hydraulic pressure (hereinafter, it is referred to as a "high pressure"), and a drive portion 40 that drives a drive shaft 31 of the first and second hydraulic pump 10 and 20.

The low hydraulic pressure is supplied to the low pressure portion (L) of the automatic transmission to have a low pressure suitable to lubrication. The high hydraulic pressure is supplied to the high pressure portion (C) of the automatic transmission to have a high pressure suitable to effectively operate the clutch.

The drive portion 40 includes an engine or a motor to drive the drive shaft 31 such that the first and second hydraulic pump 10 and 20 are operated together. In this case, the first hydraulic pump 10 discharges a low hydraulic pressure to supply low pressure portion (L) with this and the second hydraulic pump 20 raises the low hydraulic pressure of the first hydraulic pump 10 to the high hydraulic pressure to supply the high pressure portion (C) with this.

Figure 2:
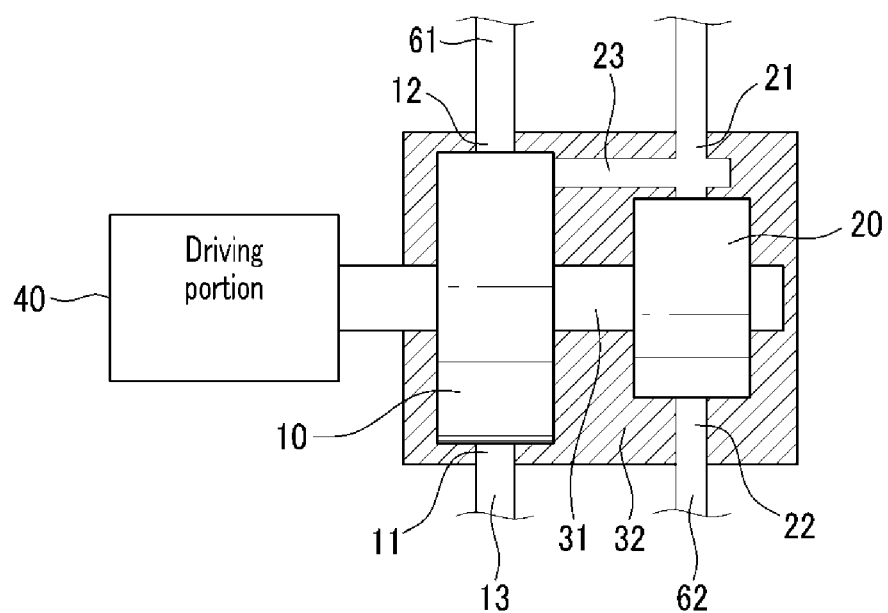
FIG. 2 is a schematic diagram of a hydraulic pump that is applied to FIG. 1.

FIG. 2 is a schematic diagram of a hydraulic pump that is applied to FIG. 1. Referring to FIG. 2, a first suction hole 11 is connected to an oil fan 50, the first hydraulic pump 10 sucks oil through the first suction hole 11, and the first discharge hole 12 is connected to the low pressure portion (L) to discharge a low hydraulic pressure to the first discharge hole 12.

The second suction hole 21 is connected to the first discharge hole 12 through a connection passage 23, the second hydraulic pump 20 sucks a low hydraulic pressure through the second suction hole 21, and the second discharge hole 22 is connected to a high pressure portion (C) to supply a high hydraulic pressure.

The first and second hydraulic pump 10 and 20 is operated by a drive shaft 31 that is integrally formed to be built in a pump body. Accordingly, the connection passage 23 is formed between the first and second hydraulic pump 10 and 20 in the pump body 32 to connect the first discharge hole 12 with the second suction hole 21. Accordingly, an equal hydraulic pressure i.e. a low pressure is applied to the first discharge hole 12 and the second suction hole 21.

The oil of a low hydraulic pressure that is discharged by the first hydraulic pump 10 is larger than that of a high hydraulic pressure that is discharged from the second hydraulic pump 20. The first hydraulic pump 10 discharges a total oil based on a low pressure, and the second hydraulic pump 20 boosts a pressure to discharge as much as it needs. Accordingly, a power loss for the hydraulic pump is minimized, durability is improved, and noise and pressure vibration of the hydraulic pump is reduced.

Referring to FIG. 1, the first suction hole 11 of the first hydraulic pump 10 is connected to the oil fan 50 through the suction passage 13 and the first discharge hole 12 is connected to a low pressure portion (L) through the low pressure passage 61. The second discharge hole 22 of the second hydraulic pump 20 is connected to the high pressure portion (C) through the high pressure passage 62.

A low pressure regulating valve 14 is connected to a oil passage diverged from the low pressure passage 61 to be connected to the oil fan 50 through a recirculation passage 15. Accordingly, the low pressure regulating valve 14 sets an oil of a low hydraulic pressure that is supplied to the low pressure passage 61 and recirculates a remained oil to the oil fan 50 through the recirculation passage 15. That is, a predetermined oil of low pressure is formed in the low pressure passage 61 according to the oil that is recirculated to the oil fan 50 from the low pressure regulating valve 14.

The first switch valve 71 is connected to an oil passage that is diverged from the high pressure passage 62 and is on/off controlled by a solenoid valve 51 to regulate an oil of the high pressure passage 62.

That is, while the first switch valve 71 is turned on (refers to FIG. 1), a high hydraulic pressure of the high pressure passage 62 is transferred from an inflow port 711 to an outflow port 712, and while the first switch valve 71 is turned off (refers to FIG. 3), a low hydraulic pressure of the high pressure passage 62 is disconnected between the inflow port 711 and the outflow port 712.

The high pressure regulating valve 24 is connected to an outflow port 712 of the first switch valve 71 to be connected to the second suction hole 21 of the second hydraulic pump 20 through a recirculation passage 25. Also, the high pressure regulating valve 24 controls an oil of high pressure during an 'ON' of the first switch valve 71 and stops its operating during an 'OFF' thereof.

Accordingly, the high pressure regulating valve 24 sets a hydraulic pressure passing the first switch valve 71 to set an oil flux that is supplied to the high pressure passage 62 and recirculates a remained oil to the second suction hole 21 of the second hydraulic pump 20. That is, an oil of a predetermined high pressure is formed in the high pressure passage 62 according to an oil that is recirculated to the second suction hole 21 of the second hydraulic pump 20 through the high pressure regulating valve 24.

The second switch valve 72 is disposed on the high pressure passage 62 and is turned off or on by the solenoid valve 51 to regulate a high hydraulic pressure supplied to the high pressure portion (C).

Figure 3:
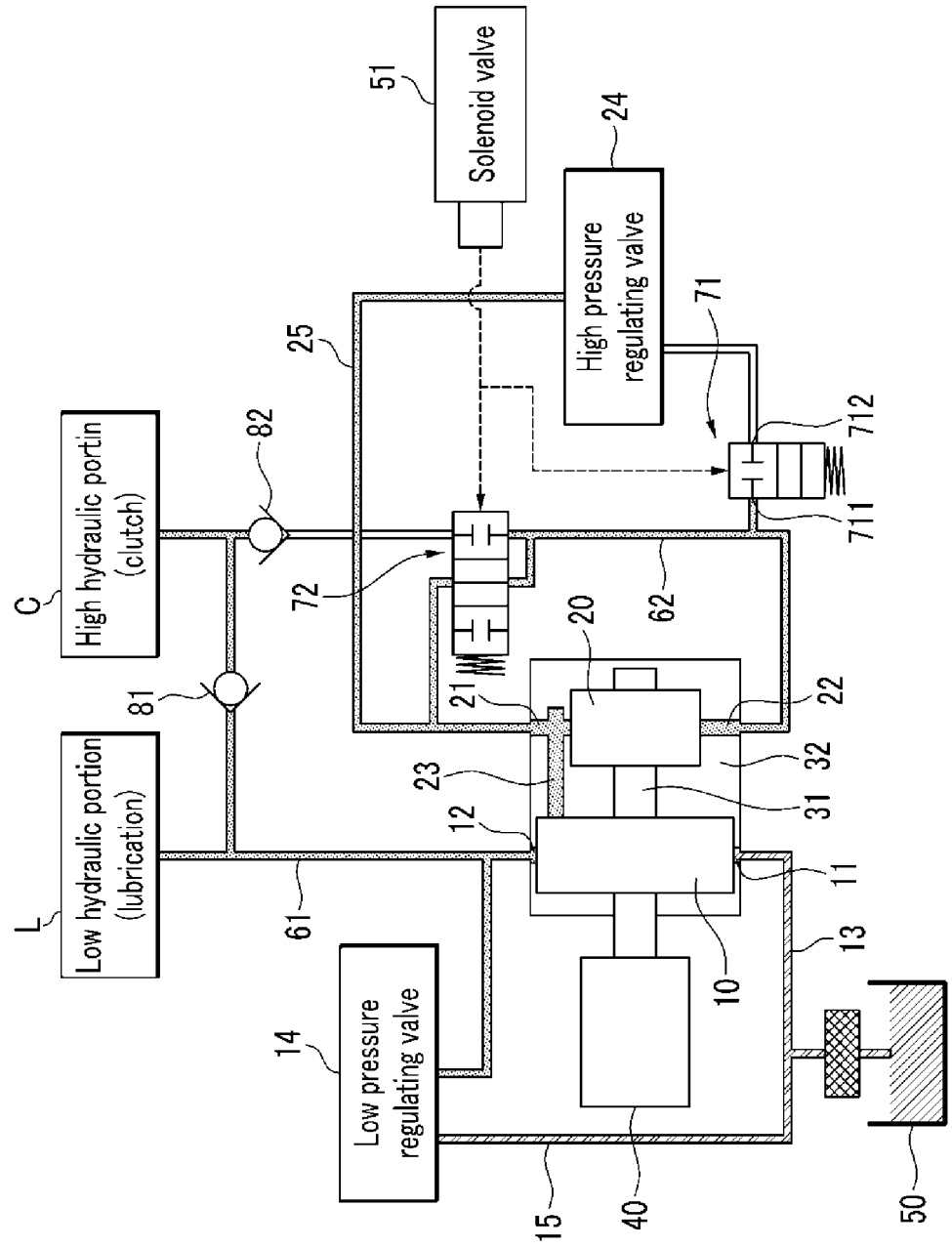
FIG. 3 is a hydraulic circuit diagram showing a condition that a high pressure portion of an exemplary hydraulic pump system for an automatic transmission is not operated according to the present invention.

That is, while the first switch valve 71 is turned on, the second switch valve 72 supplies an oil of high hydraulic pressure discharged from the second discharge hole 22 to the high pressure portion (C) (refers to FIG. 1), and while the first switch valve 71 is turned off, the second switch valve 72 recirculates an oil of low hydraulic pressure discharged from the second discharge hole 22 to the second suction hole 21 (refers to FIG. 3).

Also, a first check valve 81 is disposed between the high pressure passage 62 and the low pressure passage 61 to supply the high pressure portion (C) with a low hydraulic pressure from the low pressure passage 61 to lubricate the high pressure portion (C) that is not operated, while a high hydraulic pressure is not supplied to the high pressure passage 62.

The second check valve 82 is disposed between the second switch valve 72 and the high pressure portion (C) on the high pressure passage 62 to prevent a low hydraulic pressure supplied to the high pressure portion (C) from being supplied to the second switch valve 72.

Overall operations of a hydraulic pump system according to various embodiments will be described. Referring to FIG. 1, the first and second hydraulic pump 10 and 20 are operated by the drive shaft 31 that is rotated by the drive portion 40.

A high hydraulic pressure that is discharged from the first hydraulic pump 10 to be controlled by the low pressure regulating valve 14 is supplied to the low pressure portion (L) through the low pressure passage 61 to lubricate the low pressure portion (L).

A low hydraulic pressure that is supplied from the first hydraulic pump 10 to the second hydraulic pump 20 through the connection passage 23 is boosted by the second hydraulic pump 20. The boosted high hydraulic pressure is supplied to the high pressure portion (C) through the high pressure passage 62 to operate this. The second switch valve 72 cuts off the second suction hole 21 of the second hydraulic pump 20 from the high pressure passage 62. This case includes a condition that the high pressure portion (C) i.e. the clutch is operated while the vehicle accelerates or travels a slant road.

That is, the solenoid valve 51 is turned off and the first and second switch valve 71 and 72 are turned on. A high hydraulic pressure supplied to the high pressure passage 62 passes the first switch valve 71 and is controlled by the high pressure regulating valve 24 to have a predetermined high pressure. A high hydraulic pressure passes the second switch valve 72 turned on to be supplied to the high pressure portion (C).

FIG. 3 is a hydraulic circuit diagram showing a condition that a high pressure portion of a hydraulic pump system for an automatic transmission is not operated according to various embodiments of the present invention. Referring to FIG. 3, a low hydraulic pressure that is discharged from the first hydraulic pump 10 to be controlled by the low pressure regulating valve 14 is supplied to the low pressure portion (L) through the low pressure passage 61 to lubricate this.

Also, a low hydraulic pressure that is supplied to the high pressure passage 62 from the low pressure passage 61 through the first check valve 81 is supplied to the high pressure portion (C) to lubricate the high pressure portion (C).

A low hydraulic pressure that is supplied to the second hydraulic pump 20 from the first hydraulic pump 10 through the connection passage 23 is discharged from the second hydraulic pump 20. A low hydraulic pressure is recirculated to the second hydraulic pump 20 through the high pressure passage 62. In this case, the second switch valve 72 connects the second suction hole 21 of the second hydraulic pump 20 with the high pressure passage 62. This case includes a condition that the high pressure portion (C) i.e. a clutch is not operated while the vehicle travels a flat road.

That is, the solenoid valve 51 is controlled to be turned on and the first and second switch valve 71 and 72 are controlled to be turned off. A low hydraulic pressure supplied to the high pressure passage 62 is cut off by the first switch valve 71 that is turned off to not be boosted and passes the second switch valve 72 that is turned off to be recirculated to the second hydraulic pump 20.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pump system for an automatic transmission, comprising:
    a first hydraulic pump that generates a first hydraulic pressure to supply a low pressure portion with the first hydraulic pressure;
    a second hydraulic pump that receives the first hydraulic pressure to generate a second hydraulic pressure higher than the first hydraulic pressure, wherein the second hydraulic pump supplies a high pressure portion with the second hydraulic pressure;
    a drive portion that rotates a drive shaft integrally interconnecting the first hydraulic pump with the second hydraulic pump;
    wherein the first hydraulic pump is connected to an oil fan through a first suction hole to draw in oil and is connected to the low pressure portion through a first discharge hole to discharge the first hydraulic pressure; and
    wherein the second hydraulic pump draws the first hydraulic pressure through a connection passage that connects the first discharge hole with a second suction hole and is connected to the high pressure portion through a second discharge hole to discharge the second hydraulic pressure;
    wherein the first discharge hole is connected to the low pressure portion through a low pressure passage and the second discharge hole is connected to the high pressure portion through a high pressure passage;
    wherein a first switch valve that is connected to the high pressure passage controls oil that is diverged from the second hydraulic pressure, and
    wherein a high pressure regulating valve that is connected to the first switch valve controls oil passing the first switch valve that is turned on to set the second hydraulic pressure and recirculates remained oil to the second suction hole.

2. The hydraulic pump system for an automatic transmission of claim 1, wherein a low pressure regulating valve that is connected to the low pressure passage sets the first hydraulic pressure to return remaining oil to the oil fan.

3. The hydraulic pump system for an automatic transmission of claim 1, wherein a second switch valve disposed on the high pressure passage controls the second hydraulic pressure that is supplied to the high pressure portion,
    supplies the high pressure portion with the second hydraulic pressure that is discharged from the second discharge hole by an operation of the first switch valve, and
    recirculates the first hydraulic pressure that is discharged from the second discharge hole by a disoperation of the first switch valve to the second suction hole.

4. The hydraulic pump system for an automatic transmission of claim 3, wherein the first switch valve and the second switch valve is connected to a solenoid valve to be on/off controlled.

5. The hydraulic pump system for an automatic transmission of claim 3, further comprising:
   a first check valve disposed between the high pressure passage and the low pressure passage; and
   a second check valve disposed on the high pressure passage between the second switch valve and the high pressure portion.

6. The hydraulic pump system for an automatic transmission of claim 1, wherein the drive portion includes an engine or a motor.

7. The hydraulic pump system for an automatic transmission of claim 1, wherein a first oil flux of the first hydraulic pump is larger than that of the second hydraulic pump.

* * * * *

UNITED STATES PATENT AND TRADEMARK OFFICE
CERTIFICATE OF CORRECTION

| | |
|---|---|
| PATENT NO. | : 8,668,468 B2 |
| APPLICATION NO. | : 13/170555 |
| DATED | : March 11, 2014 |
| INVENTOR(S) | : Jin Young Hwang |

It is certified that error appears in the above-identified patent and that said Letters Patent is hereby corrected as shown below:

On the Title Page, below Item (65) insert

--(30) Foreign Application Priority Data:

December 3, 2010 ............................ 10-2010-0123019--

Signed and Sealed this
Twenty-fourth Day of June, 2014

Michelle K. Lee
*Deputy Director of the United States Patent and Trademark Office*